(12) United States Patent
Birtcher et al.

(10) Patent No.: US 10,151,618 B2
(45) Date of Patent: Dec. 11, 2018

(54) ULTRASONIC LIQUID LEVEL SENSING SYSTEMS

(71) Applicant: AIR PRODUCTS AND CHEMICALS, INC., Allentown, PA (US)

(72) Inventors: Charles Michael Birtcher, Valley Center, CA (US); Thomas Andrew Steidl, Escondido, CA (US)

(73) Assignee: Versum Materials US, LLC, Tempe, AZ (US)

( * ) Notice: Subject to any disclaimer, the term of this patent is extended or adjusted under 35 U.S.C. 154(b) by 384 days.

(21) Appl. No.: 14/823,027

(22) Filed: Aug. 11, 2015

(65) Prior Publication Data
US 2016/0061645 A1     Mar. 3, 2016

Related U.S. Application Data

(60) Provisional application No. 62/043,668, filed on Aug. 29, 2014.

(51) Int. Cl.
    *G01F 23/296*     (2006.01)
(52) U.S. Cl.
    CPC ........ *G01F 23/296* (2013.01); *G01F 23/2961* (2013.01); *G01F 23/2965* (2013.01)
(58) Field of Classification Search
    USPC ..................................................... 73/290 V
    See application file for complete search history.

(56) References Cited

U.S. PATENT DOCUMENTS

| | | |
|---|---|---|
| 4,063,457 A | 12/1977 | Zekulin et al. |
| 4,077,022 A | 2/1978 | Pitts, Jr. |
| 4,316,183 A | 2/1982 | Palmer et al. |
| 5,437,178 A | 8/1995 | Esin et al. |
| 5,507,178 A | 4/1996 | Dam |
| 5,663,503 A | 9/1997 | Dam et al. |
| 5,697,248 A | 12/1997 | Brown |
| 5,842,374 A | 12/1998 | Chang |
| 6,077,356 A * | 6/2000 | Bouchard ............... B01J 4/008 118/715 |
| 6,246,154 B1 | 6/2001 | Gluszyk et al. |

(Continued)

FOREIGN PATENT DOCUMENTS

| | | |
|---|---|---|
| CN | 101769777 | 7/2010 |
| CN | 202141496 | 2/2012 |

(Continued)

*Primary Examiner* — Paul West
*Assistant Examiner* — Mark A Shabman
(74) *Attorney, Agent, or Firm* — Lina Yang

(57) ABSTRACT

An ultrasonic probe having ultrasonic sensors (e.g., piezoelectric crystals) for measuring the level of liquid within a sealed container and having features that make the probe more reliable and enable more precise liquid level readings as the container nears an empty state. Embodiments include spacing the ultrasonic sensors more closely at the lower end of the probe, offsetting the sensors to enable tighter vertical spacing, matched pairs of sensors for redundancy, and a downward facing sensor located at the lower end of the probe to decrease the minimum liquid level that can be accurately measured by the probe. A sump may also be provided to further decrease the minimum liquid level that can be accurately measured by the probe.

26 Claims, 6 Drawing Sheets

(56) References Cited

U.S. PATENT DOCUMENTS

| | | |
|---|---|---|
| 7,694,560 B1 | 4/2010 | Dam et al. |
| 8,248,888 B1 | 8/2012 | Enzler et al. |
| 2001/0010171 A1* | 8/2001 | Atkinson ............ G01F 23/0046 73/290 V |
| 2004/0011126 A1 | 1/2004 | Otto et al. |
| 2004/0173021 A1 | 9/2004 | Lizon et al. |
| 2006/0116584 A1 | 6/2006 | Sudol et al. |
| 2006/0133955 A1* | 6/2006 | Peters ................ C23C 16/4481 422/63 |
| 2010/0132453 A1* | 6/2010 | Dam ................... G01F 23/2962 73/290 V |
| 2010/0257931 A1* | 10/2010 | Partington .......... G01F 23/2961 73/290 V |
| 2013/0047719 A1 | 2/2013 | Knowles |
| 2013/0220012 A1 | 8/2013 | Knowles et al. |
| 2014/0020480 A1 | 1/2014 | Schmidt et al. |
| 2014/0338442 A1 | 11/2014 | Birtcher et al. |

FOREIGN PATENT DOCUMENTS

| | | |
|---|---|---|
| DE | 2508297 | 9/1976 |
| DE | 102005054203 | 5/2007 |
| DE | 102005054203 A1 | 5/2007 |
| EP | 0028114 | 5/1981 |
| EP | 1006219 | 6/2000 |
| EP | 2803955 A2 | 11/2014 |
| JP | 11218436 | 8/1999 |
| JP | 2001503106 A | 3/2001 |
| JP | 2001146031 | 5/2001 |
| JP | 2001312785 | 11/2001 |
| JP | 2004028765 | 1/2004 |
| JP | 2004150948 | 5/2004 |
| JP | 2010276593 | 9/2010 |
| SU | 1592731 | 9/1990 |
| WO | 9302340 | 2/1993 |
| WO | 9823951 | 6/1998 |
| WO | 03012379 | 2/2003 |
| WO | 2009063194 A2 | 5/2009 |
| WO | 2012065109 A1 | 5/2012 |

* cited by examiner

ULTRASONIC LIQUID LEVEL SENSING SYSTEMS

CROSS REFERENCE TO RELATED APPLICATIONS

The application claims the benefit of U.S. Provisional Application No. 62/043,668, filed on Aug. 29, 2014. Co-pending U.S. patent application Ser. No. 14/163,407, filed Jan. 24, 2014 is incorporated by reference as if fully set forth.

BACKGROUND OF THE INVENTION

Semiconductor manufacturing processes involve the use of chemical reagents that must meet strict purity requirements. These liquid chemical reagents are typically contained in sealed containers (e.g., ampoules) to protect against contamination of the chemical reagents and to prevent leakage. The chemical reagents typically require metal containers and container fittings that use metal-on-metal seals to avoid corrosion, contamination, or leakage under elevated pressures. When using a chemical reagent stored in such a container, it is often necessary to be able to determine the amount of chemical reagent left in the container without exposing the chemical reagent to the environment or exposing an operator to the chemical reagent.

Ultrasonic probes are commonly used in the semiconductor industry to measure the level of chemical reagent within a sealed container. A typical design includes multiple ultrasonic sensors positioned in a series along the length of a conduit within the probe, such as the sensors and configuration disclosed in U.S. Pat. No. 5,663,503 to Dam et al. A signal processing device (e.g., a controller, meter, personal computer, etc.) transmits electronic signals to the ultrasonic sensors, which in turn generate bursts of sound waves that pass through the conduit and echo back to the sensors. Each sensor converts the echoed waves it receives into electronic signals that are transmitted back to the signal processing device. The signal processing device then interprets the electronic signals to determine the intensity of the echoed waves as well as the time that elapsed between emission and the arrival of the echoed waves. For each sensor positioned along a particular portion of the conduit, the speed with which the ultrasonic waves travel through the conduit and the intensity of the echoed ultrasonic wave will differ depending on whether that portion of the conduit contains chemical reagent or gas or vapor (i.e., sound travels faster through a liquid medium as compared to gas or vapor). In this manner, the signal processing device can determine the level of the chemical reagent along the length of the conduit and therefore the amount of chemical reagent within the container.

Generally, a greater number of ultrasonic sensors disposed within the ultrasonic probe translates into increased accuracy in measuring chemical reagent levels. However such sensors are limited in that they cannot accurately measure chemical reagent levels that are near or below the lower end of the probe. This presents a problem because of the exacting nature of semiconductor manufacturing processes and environments, the cost associated with the chemical reagents and the cost associated with disposing of leftover chemical reagent when cleaning the containers.

Accordingly, there is a need in the art for an ultrasonic probe having the ability to measure the level of small amounts of chemical reagent within the container.

SUMMARY OF THE INVENTION

Several specific aspects of the present invention are outlined below.

Aspect 1. An ultrasonic probe for sensing a liquid level within a container, the ultrasonic probe comprising a barrel extending downwardly from a fitting assembly and comprising an internal volume defined by an inner tube and a conduit disposed longitudinally within the barrel, the inner tube having a longitudinal axis and a lower end that is distal to the fitting assembly, the barrel having a length; and a plurality of ultrasonic sensors located within an internal volume of the barrel, each of the plurality of ultrasonic sensors configured to emit sound waves in response to received electronic signals, each of the plurality of ultrasonic sensors having a vertical spacing; wherein at least one of the plurality of ultrasonic sensors is affixed to the inner tube at a location and in an orientation adapted to emit sound waves across the conduit of the barrel in response to a received electronic signal; wherein the plurality of ultrasonic sensors includes an upper group comprising at least three ultrasonic sensors and a lower group comprising at least three ultrasonic sensors, the ultrasonic sensors of the upper group being located further from the lower end of the inner tube than any of the ultrasonic sensors of the lower group, the vertical spacing of each of the ultrasonic sensors in the lower group being less than the vertical spacing of any of the ultrasonic sensors in the upper group.

Aspect 2. The ultrasonic probe of Aspect 1, wherein each of the ultrasonic sensors of the lower group is vertically offset from each vertically adjacent ultrasonic sensor of the lower group.

Aspect 3. The ultrasonic probe of Aspect 2, wherein the vertical offset of each of the ultrasonic sensors of the lower group is in a same circumferential direction as the vertical offset of all of the other ultrasonic sensors of the lower group.

Aspect 4. The ultrasonic probe of any of Aspects 1-3, wherein the vertical spacing between each of the ultrasonic sensors in either the upper group or the lower group is identical.

Aspect 5. The ultrasonic probe of Aspect 4, wherein the vertical spacing between each of the ultrasonic sensors in the upper group is identical and the vertical spacing between each of the ultrasonic sensors in the lower group is identical.

Aspect 6. The ultrasonic probe of any of Aspects 1-5, wherein the plurality of ultrasonic sensors includes a middle group comprising at least three ultrasonic sensors, the ultrasonic sensors of the middle group being located further from the lower end of the inner tube than any of the ultrasonic sensors of the lower group and closer to the lower end of the inner tube than any of the ultrasonic sensors of the upper group, the vertical spacing of each of the ultrasonic sensors in the middle group being less than the vertical spacing of any of the ultrasonic sensors in the upper group and greater than the vertical spacing of any of the ultrasonic sensors of the lower group.

Aspect 7. The ultrasonic probe of any of Aspects 1-6, wherein the vertical spacing of the ultrasonic sensors in the lower group is less than 0.3 inches (0.76 cm).

Aspect 8. The ultrasonic probe of any of Aspects 1-7, wherein the lower group comprises at least four ultrasonic sensors.

Aspect 9. The ultrasonic probe of any of Aspects 1-8, wherein the lower group is located with a lower quarter of the length of the barrel, the lower quarter being distal to the fitting assembly.

Aspect 10. The ultrasonic probe of any of Aspects 1-9, wherein the plurality of ultrasonic sensors comprises a downward-facing sensor oriented to emit sound waves toward a base of the container.

Aspect 11. The ultrasonic probe of Aspect 10, wherein the downward-facing sensor is affixed to an end disc cap of the barrel, the end disc cap of the barrel substantially perpendicular to the inner tube, such that the downward-facing sensor is oriented to emit sound waves in a direction substantially parallel to a longitudinal axis of the barrel.

Aspect 12. The ultrasonic probe of Aspect 10, wherein the base of the container comprises a sump positioned such that at least a portion of the sump is vertically aligned with the barrel when the ultrasonic probe is installed in the container.

Aspect 13. The ultrasonic probe of Aspect 12, wherein the sump is aligned coaxially with the longitudinal axis of the barrel of the ultrasonic probe when the ultrasonic probe is installed in the container Aspect 14. The ultrasonic probe of Aspect 12, wherein the sump has a diameter larger than the diameter of the barrel.

Aspect 15. The ultrasonic probe of any of Aspects 1-14, wherein the plurality of ultrasonic sensors comprises matched pairs of ultrasonic sensors, each of the matched pairs of ultrasonic sensors comprising a first and second ultrasonic sensors disposed horizontally across the conduit from one another at a matched height of the barrel.

Aspect 16. The ultrasonic probe of Aspect 15, wherein the ultrasonic probe is electrically coupled to at least one controller that is configured to send electronic signals to and receive electronic signals from the plurality of ultrasonic sensors, wherein the at least one controller is programmed to send electronic signals to only one of the first and second ultrasonic sensors of a matched pair at a time.

Aspect 17. The ultrasonic probe of Aspect 16, wherein the ultrasonic probe is electrically coupled to at least one controller that is configured to send electronic signals to and receive electronic signals from the plurality of ultrasonic sensors, wherein the at least one controller is programmed to send electronic signals to only one of the first and second ultrasonic sensors of a matched pair at a time.

Aspect 18. The ultrasonic probe of Aspect 16, wherein the at least one controller comprises a first controller electrically coupled to a first ultrasonic sensor of each matched pair of ultrasonic sensors, and a second controller electrically coupled to a second ultrasonic sensor of each matched pair of ultrasonic sensors.

Aspect 19. The ultrasonic probe of Aspect 16, wherein each ultrasonic sensor of the plurality of ultrasonic sensors is electrically coupled to the at least one controller by at least one unshielded wire of a multi-conductor shielded cable.

Aspect 20. An ultrasonic probe for sensing a liquid level within a container, the ultrasonic probe comprising: a barrel extending downwardly from a fitting assembly and comprising an internal volume defined by an inner tube and a conduit disposed longitudinally within the barrel, the inner tube having a longitudinal axis and a lower end that is distal to the fitting assembly, the barrel having a length; and a plurality of ultrasonic sensors located within an internal volume of the barrel, each of the plurality of ultrasonic sensors configured to emit sound waves in response to received electronic signals; wherein at least one of the plurality of ultrasonic sensors is affixed to the inner tube at a location and in an orientation adapted to emit sound waves across the conduit of the barrel in response to a received electronic signal; wherein the plurality of ultrasonic sensors comprises at least one sensor that is offset from each vertically adjacent ultrasonic sensor.

Aspect 21. The ultrasonic probe of Aspect 20, wherein the each of the plurality of ultrasonic sensors has a vertical spacing, the plurality of ultrasonic sensors includes an upper group comprising at least three ultrasonic sensors and a lower group comprising at least three ultrasonic sensors, the ultrasonic sensors of the upper group being located further from the lower end of the inner tube than any of the ultrasonic sensors of the lower group, each of the ultrasonic sensors of the lower group is vertically offset from each vertically adjacent ultrasonic sensor of the lower group.

Aspect 22. The ultrasonic probe of any of Aspects 20-21, wherein each of the plurality of ultrasonic sensors that is offset from each vertically adjacent ultrasonic sensor is vertically offset 90 degrees from each vertically adjacent ultrasonic sensor.

Aspect 23. An ultrasonic probe for sensing a liquid level within a container, the ultrasonic probe comprising: a barrel extending downwardly from a fitting assembly and comprising an internal volume defined by an inner tube and a conduit disposed longitudinally within the barrel, the inner tube having a longitudinal axis and a lower end that is distal to the fitting assembly, the barrel having a length; and a plurality of ultrasonic sensors located within an internal volume of the barrel, each of the plurality of ultrasonic sensors configured to emit sound waves in response to received electronic signals, each of the plurality of ultrasonic sensors having a vertical spacing; wherein at least one of the plurality of ultrasonic sensors is affixed to the inner tube at a location and in an orientation adapted to emit sound waves across the conduit of the barrel in response to a received electronic signal; wherein the plurality of ultrasonic sensors comprises a downward-facing sensor oriented to emit sound waves toward a base of the container.

Aspect 24. The ultrasonic probe of Aspect 23, wherein the downward-facing sensor is affixed to an end disc cap of the barrel, the end disc cap of the barrel substantially perpendicular to the inner tube, such that the downward-facing sensor is oriented to emit sound waves in a direction substantially parallel to a longitudinal axis of the barrel.

Aspect 25. The ultrasonic probe of any of Aspects 23-24, wherein the base of the container comprises a sump positioned such that at least a portion of the sump is vertically aligned with the barrel when the ultrasonic probe is installed in the container.

Aspect 26. The ultrasonic probe of Aspect 25, wherein the sump is aligned coaxially with the longitudinal axis of the barrel of the ultrasonic probe when the ultrasonic probe is installed in the container.

Aspect 27. An ultrasonic probe for sensing a liquid level within a container, the ultrasonic probe comprising: a barrel extending downwardly from a fitting assembly and comprising an internal volume defined by an inner tube and a conduit disposed longitudinally within the barrel, the inner tube having a longitudinal axis and a lower end that is distal to the fitting assembly, the barrel having a length; and a plurality of ultrasonic sensors located within an internal volume of the barrel, each of the plurality of ultrasonic sensors configured to emit sound waves in response to received electronic signals; wherein at least one of the plurality of ultrasonic sensors is affixed to the inner tube at a location and in an orientation adapted to emit sound waves across the conduit of the barrel in response to a received electronic signal; wherein the plurality of ultrasonic sensors comprises matched pairs of ultrasonic sensors, each of the matched pairs of ultrasonic sensors comprising a first and second ultrasonic sensors disposed horizontally across the conduit from one another at a matched height of the barrel;

wherein the ultrasonic probe is electrically coupled to at least one controller that is configured to send electronic signals to and receive electronic signals from the plurality of ultrasonic sensors, wherein the at least one controller is programmed to send electronic signals to only one of the first and second ultrasonic sensors of a matched pair at a time.

BRIEF DESCRIPTION OF THE DRAWING FIGURES

Embodiments of the present invention will hereinafter be described in conjunction with the appended drawing figures wherein like numerals denote like elements.

DETAILED DESCRIPTION OF THE PREFERRED EMBODIMENTS

Figure 1:
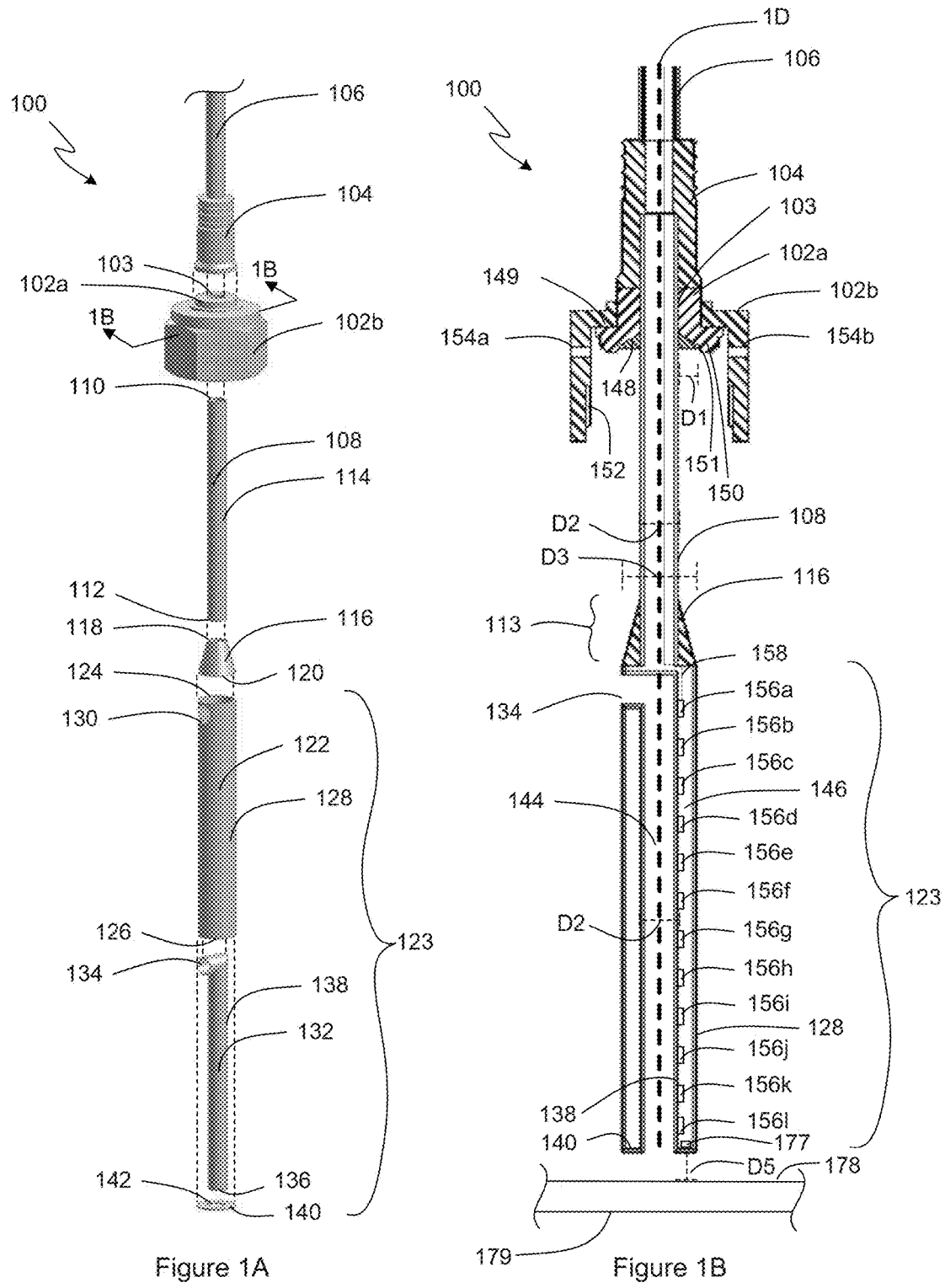
FIG. 1A is an exploded perspective view of an ultrasonic probe in accordance with an exemplary embodiment of the present invention.
FIG. 1B is a non-exploded sectional view, taken along line 1B-1B, of the ultrasonic probe of FIG. 1A.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. Various changes may be made in the function and arrangement of elements without departing from the spirit and scope of the invention, as set forth in the appended claims.

In the figures, elements that are similar to those of other embodiments of the present invention are represented by reference numerals increased by a value of 100. Such elements should be regarded as having the same function and features unless otherwise stated or depicted herein, and the discussion of such elements may therefore not be repeated for multiple embodiments.

The term "conduit," as used in the specification and claims, refers to one or more structures through which fluids can be transported between two or more components of a system. For example, conduits can include pipes, ducts, passageways, and combinations thereof that transport liquids, vapors, and/or gases.

The term "flow communication," as used in the specification and claims, refers to the nature of connectivity between two or more components that enables liquids, vapors, and/or gases to be transported between the components in a controlled fashion (i.e., without leakage). Coupling two or more components such that they are in flow communication with each other can involve any suitable method known in the art, such as with the use of welds, flanged conduits, gaskets, and bolts. Two or more components may also be coupled together via other components of the system that may separate them.

In order to aid in describing the invention, directional terms may be used in the specification and claims to describe portions of the present invention (e.g., upper, lower, left, right, etc.). These directional terms are merely intended to assist in describing and claiming the invention, and are not intended to limit the invention in any way. In addition, reference numerals that are introduced in the specification in association with a drawing figure may be repeated in one or more subsequent figures without additional description in the specification in order to provide context for other features.

FIGS. 1A and 1B show an ultrasonic probe 100 in accordance with an exemplary embodiment of the present invention. More specifically, FIG. 1A shows an exploded perspective view of the ultrasonic probe 100 and FIG. 1B shows a non-exploded sectional view of the ultrasonic probe 100 taken along line 1B-1B of FIG. 1A. Dashed line 1D indicates a longitudinal axis of probe 100.

The ultrasonic probe 100 comprises seal fitting members 102a and 102b, a flexible connector 104, a cable sheath 106, a neck tube 108 having a shoulder portion 113, and a barrel 123. As discussed in greater detail herein, the seal fitting members 102a and 102b are portions of a seal fitting assembly 157 that secures the ultrasonic probe 100 to a container 159. In exemplary embodiments, such as described in related co-pending U.S. patent application Ser. No. 14/163,407 filed Jan. 24, 2014, the teachings of which are incorporated by reference herein, the seal fitting assembly 157 is a face seal fitting assembly, where the seal fitting member 102a is a face seal fitting gland having a through hole 103 and the seal fitting member 102b is a standard sized face seal fitting having a three-quarter-inch (19.1 mm) hex nut. In this embodiment, the seal fitting member 102b rests on a lip 149 of the seal fitting member 102a and can be rotated relative to the seal fitting member 102a about an axis drawn through the through hole 103. In alternative embodiments, as will be apparent to those of ordinary skill in the art, the seal fitting members 102a and 102b can have other dimensions and features, such as a longer gland, a half-inch (12.7 mm) or a non-standard size face seal fitting, and/or a seal fitting member 102b that is bonded to the seal fitting member 102a. Similarly, other types of fittings can be used for seal fitting assembly 157, such as, for example, a surface mount C-seal.

The seal fitting member 102a is coupled to the flexible connector 104 and the cable sheath 106. The neck tube 108 comprises an upper end 110 that defines an upper opening, a lower end 112 that defines a lower opening, and a sidewall 114. In this embodiment, the shoulder portion 113 of the neck tube 108 comprises a shoulder tube 116 having an upper end 118 that defines an upper opening and a lower end 120 that defines a lower opening. In exemplary embodiments such as shown in FIG. 1A and as described in related co-pending U.S. patent application Ser. No. 14/163,407, the shoulder tube 116 is conical in shape and provides a smooth transition from the neck tube 108 to the outer tube 122 of the barrel 123. The lower end 112 of the neck tube 108 is disposed within the shoulder tube 116 and the shoulder tube 116 is coupled to the sidewall 114 of the neck tube 108. In other embodiments, the entire neck tube 108, including the shoulder portion 113, can be formed of a single unitary part. The upper end 110 of the neck tube 108 is disposed within the through hole 103 of the seal fitting member 102a and within the flexible connector 104.

The barrel 123 comprises an outer tube 122, an inner tube 132, and a disc cap 140. The outer tube 122 has an upper end 124 that defines an upper opening, a lower end 126 that defines a lower opening, a sidewall 128, and a through hole 130 disposed in the sidewall 128 near the upper end 124. The upper end 124 of the outer tube 122 is coupled to the lower end 120 of the shoulder tube 116.

The inner tube 132 comprises an upper end 124 that defines an upper opening, a lower end 136 that defines a lower opening, and a sidewall 138. In this exemplary embodiment, the upper end 134 defines an upper opening that is approximately perpendicular to the lower opening defined by the lower end 136. The inner tube 132 defines a conduit 144 (see FIG. 1B). In should be understood that, in other embodiments of the invention, the conduit may not be fully enclosed, as is the case with ultrasonic probe 100. For example, in a probe having a "tuning fork" style barrel (i.e., having two spaced-apart members extending downwardly) the conduit could comprise a space located between the two spaced-apart members.

The disc cap 140 comprises an inner rim 142 that defines an opening. In an assembled configuration, the entirety of the inner tube 132 is disposed within the outer tube 122, the upper end 134 of the inner tube 132 is aligned with the through hole 130 disposed in the sidewall 128, and the lower end 136 of the inner tube 132 is aligned with the lower end 126 of the outer tube 122. The upper end 134 of the inner tube 132 is coupled to the sidewall 128. The disc cap 140 is coupled to the lower end 126 of the outer tube 122 and the lower end 136 of the inner tube 132, thereby coupling the lower end 126 of the outer tube 122 to the lower end 136 of the inner tube 132.

The conduit 144 is disposed within the barrel 123 and has a lower opening defined by the lower end 136 of the inner tube 132 (the lower opening can also be regarded as being defined by the inner rim 142 of the disc cap 140) (see FIG. 1B). When the barrel 123 is inserted into a container (see container 159 of FIG. 2), the conduit 144 is in flow communication with the internal volume of the container that holds liquid such that the liquid can flow through the conduit 144.

The sidewall 128 of the outer tube 122 and the sidewall 138 of the inner tube 132 define an internal volume 146 (i.e., a compartment) therebetween that is also bounded by the disc cap 140, as shown. The internal volume 146 is isolated from the conduit 144 (i.e., the internal volume 146 is not in flow communication with the conduit 144) such that any liquid flowing through the conduit 144 cannot enter the internal volume 146.

A plurality of ultrasonic sensors 156 is disposed within the internal volume 146 of the barrel 123. In one exemplary embodiment, the plurality of ultrasonic sensors 156 includes twelve (12) ultrasonic sensors 156a through 156l that are coupled to the sidewall 138 of the inner tube 132 and an ultrasonic sensor 177 that is coupled, in some embodiments, to sidewall 138, and in alternative embodiments, is coupled to disc cap 140. In this embodiment, each of the plurality of ultrasonic sensors 156a through 156l are bonded to sidewall 138, and ultrasonic sensor 177 is bonded to disc cap 140, with an epoxy. Thus, ultrasonic sensors 156a through 156l are oriented to emit sound waves in the direction facing sidewall 138 (e.g., perpendicular to longitudinal axis 1D), and ultrasonic sensor 177 is oriented to emit sound waves in the direction of disc cap 140 (e.g., parallel to longitudinal axis 1D). Other suitable means for coupling can also be used, such as double-sided tape or other adhesives. In other embodiments, the plurality of ultrasonic sensors 156 can include a greater or lesser number of sensors. Preferably the plurality of ultrasonic sensors 156 includes at least 5 ultrasonic sensors. The plurality of ultrasonic sensors 156 and ultrasonic sensor 177 can be implemented with any suitable ultrasonic sensors that are known to those of ordinary skill in the art, such as, for example, piezoelectric crystals. Each ultrasonic sensor of the plurality of ultrasonic sensors 156a through 156l is oriented to emit sound waves through the sidewall 138 and the conduit 144 (and any liquid present therein) and detect the sound waves that are echoed back. Ultrasonic sensor 177 is oriented to emit sound waves through disc cap 140 to the inner surface 178 of the base 179 of container 159 (and any liquid present therein) and detect the sound waves that are echoed back.

In this embodiment, the sensors 156a through 156l are shown as being attached to the sidewall 138, which is parallel to the longitudinal axis 1D. It is possible that, in alternate embodiments, sensors 156a through 156l might not be oriented to emit waves in a direction that is not perpendicular to the longitudinal axis 1D. It is important, however, that these sensors 156a through 156l be oriented to detect the presence of liquid in the conduit 144. Similarly, ultrasonic sensor 177 could be oriented to emit and receive sound waves along an axis that is not parallel to the longitudinal axis 1D. It is important, however, that the downward-facing ultrasonic sensor 177 be oriented so that it can detect the presence of liquid filling the space between the bottom of the barrel 123 and the base 179 of the container 159.

Each ultrasonic sensor of the plurality of ultrasonic sensors 156a through 156l and ultrasonic sensor 177 includes wiring 158 (comprising at least one wire) that extends from the internal volume 146, through the neck tube 108, and through the cable sheath 106. The wiring 158 is terminated at a connector 107 that is plugged into a controller 109 (see FIG. 2).

Controller 109 is a programmable data processing device that transmits electronic signals to the plurality of ultrasonic sensors 156 and ultrasonic sensor 177, receives electronic signals from the plurality of ultrasonic sensors 156 and ultrasonic sensor 177, and determines the level of liquid within container 159 into which the ultrasonic probe 100 is inserted. In this embodiment, controller 109 comprises one or more microprocessors (not shown), a power supply (not shown), at least one input/output port (not shown) to receive connector 107, and a light-emitting-diode (LED) meter or liquid crystal display (LCD) 111 that provides a visual indication of the amount of liquid within the container. In alternative embodiments, controller 109 can include other input/output ports and/or other aural and visual mechanisms for indicating the level of liquid within the container. Similarly, controller 109 may be implemented with any type of programmable data processing device, including a personal computer executing control software.

For each ultrasonic sensor of the plurality of ultrasonic sensors 156 and ultrasonic sensor 177, controller 109 transmits an electronic signal (e.g., one or more electronic pulses) to the ultrasonic sensor via the wiring 158, which causes the ultrasonic sensor to emit sound waves (i.e., the piezoelectric crystal oscillates). The ultrasonic sensor then receives echoed sound waves and converts the echoed waves into an electronic signal that is transmitted back to controller 109 via wiring 158. In a preferred embodiment, controller 109 transmits a series of multiple pulses (e.g., 20 pulses) to an individual one of the ultrasonic sensors 156 and 177, which emits sound waves corresponding to the pulses. Controller 109 waits for a predetermined time period (e.g., a time window) to allow the ultrasonic sensor to receive any echoed waves returning from the emitted sound waves. If an echoed wave is received by the ultrasonic sensor, the sensor generates a signal that is transmitted to controller 109 (e.g., the piezoelectric crystal oscillates at a frequency and intensity based on the frequency and intensity of the received echoed waves). Based on whether any echoed waves are received in the time window (e.g., based on the frequency and/or intensity of any signal generated by the ultrasonic sensor), controller 109 determines whether liquid is present in conduit 144 at the given ultrasonic sensor. Typically, when no liquid is present, little or no echoed waves will be sensed by the ultrasonic sensor in the time window (e.g., the intensity of the piezoelectric crystal oscillation would be very low, or none at all), and when liquid is present, the echoed waves are generally similar in frequency and intensity as the transmitted waves. After the time window expires, controller 109 transmits a series of multiple pulses to a next one of the ultrasonic sensors to sense the presence of liquid at a next level of ultrasonic probe 100.

As previously discussed, controller 109 interprets the intensity of the received signal as well as the time that elapsed between sending the electronic signal to the ultrasonic sensor and receiving the electronic signal from the ultrasonic sensor to determine whether there is liquid at the portion of conduit 144 at which that particular sensor is disposed. Accordingly, by using the plurality of ultrasonic sensors 156, the controller 109 can determine the level of liquid along the length of the conduit 144 and therefore the amount of liquid within the container into which the barrel 123 is inserted. Similarly, by using ultrasonic sensor 177, controller 109 can determine the presence or absence of liquid filing the distance, D5, between disc cap 140 (e.g., the bottom end of ultrasonic probe 100) and an inner surface 178 of the base 179 of container 159. Each sensor of the plurality of ultrasonic sensors 156 and ultrasonic sensor 177 might be represented by an LED in the LED meter 111 to provide a visual indication of the amount of liquid within the container (e.g., each LED is illuminated only when liquid is detected by a particular sensor).

Since the distance, D5, between disc cap 140 (e.g., the bottom end of ultrasonic probe 100) and the inner surface 178 of the base 179 of container 159 is a non-zero value to allow liquid to flow into conduit 144 to be measured by ultrasonic probe 100, the bottom ultrasonic sensor (e.g., ultrasonic sensor 156*l*) of the plurality of ultrasonic sensors 156 that is oriented to emit sound waves through the sidewall 138 and the conduit 144 will be some distance above the inner surface 178 of the base of the container. Therefore, ultrasonic probe 100 will have some inherent inaccuracy in measuring the precise level of the liquid within container 159. Thus, described embodiments might desirably employ ultrasonic sensor 177 to determine the level of liquid present in the space, D5, between disc cap 140 (e.g., the bottom end of ultrasonic probe 100) and inner surface 178 of the base 179 of container 159. The space, D5, between disc cap 140 and inner surface 178 of the base 179 of container 159 might vary between different containers, but probe 100 desirably does not contact inner surface 178. By employing ultrasonic sensor 177, ultrasonic probe 100 has improved accuracy in detecting the fill level of container 159 (e.g., by detecting a level that is closer to a completely empty condition of container 159). Ultrasonic sensor 177 is disposed on the bottom of ultrasonic probe 100, emitting ultrasonic energy signal downward toward the inner surface 178 of the base 179 of container 159, thus enabling ultrasonic sensor 177 to detect when liquid no longer exists between ultrasonic probe 100 and inner surface 178, which would indicate that container 159 is very close to completely empty and allow closer to complete utilization of the liquid within container 159. Thus, described embodiments avoid a residual "heel" of unutilized liquid that often is expensive to remove and discard as a hazardous waste. Further, suppliers need not produce a new container fleet (for example new containers having sumps to measure a lower residual liquid level), rather suppliers can just upgrade ultrasonic probes into existing containers.

The controller 109 can be programmed to transmit signals to, and receive signals from, less than all of the ultrasonic sensors 156*a* through 156*l* of the plurality of ultrasonic sensors 156 and ultrasonic sensor 177 at the same time. This feature eliminates the need for the wiring 158 for the plurality of ultrasonic sensors 156 and ultrasonic sensor 177 to be individually shielded and also allows the ultrasonic sensors 156*a* through 156*l* and ultrasonic sensor 177 to be disposed closer together. In prior art systems, the wiring that connects the ultrasonic sensors to a controller is typically individually shielded to protect against interference (i.e., crosstalk) that results from electronic signals being transmitted to and from all of the ultrasonic sensors in the probe at the same time. For example, the wiring for each ultrasonic sensor in a typical prior art design may include a coaxial cable in which the inner conductor serves as the signal line to the ultrasonic sensor and the outer shield serves as the ground (e.g., grounded to a steel tube of the probe) and the signal return from the ultrasonic sensor. In prior art systems, the ultrasonic sensors within the probe must also be spaced father apart to avoid interference that results from the ultrasonic sensors simultaneously emitting sound waves. Each of these characteristics (i.e., added bulk from multiple shielded cables and greater spacing between sensors) limits the number of ultrasonic sensors that can be disposed in a probe without increasing the size of the probe and related hardware.

In a preferred embodiment, controller 109 is programmed or otherwise operatively configured to transmit signals to, and receive signals from, one ultrasonic sensor of the plurality of ultrasonic sensors 156 and ultrasonic sensor 177 at a time. For example, controller 109 can be programmed to first transmit an electronic signal to the ultrasonic sensor 156*a* and await receipt of the return signal from the ultrasonic sensor 156*a*, then transmit an electronic signal to the ultrasonic sensor 156*b* and await receipt of the return signal from the ultrasonic sensor 156*b*, and so on for each ultrasonic sensor of the plurality of ultrasonic sensors 156 and ultrasonic sensor 177. Upon having transmitted an electronic signal to, and received an electronic signal from, each of the plurality of ultrasonic sensors 156 and ultrasonic sensor 177 a first time (for example, beginning with ultrasonic sensor 156*a* and ending with ultrasonic sensor 177, although other orders are possible), the controller 109 repeats the sequence and transmits an electronic signal to, and receives an electronic signal from, the ultrasonic sensor 156*a* and each of the plurality of ultrasonic sensors 156 a second time, and so on for as long as the ultrasonic probe 100 is being operated. In this manner, the potential for interference between the wiring 158 for each ultrasonic sensor 156*a* through 156*l* and ultrasonic sensor 177 and between the ultrasonic sensors themselves is greatly reduced or eliminated because the ultrasonic sensors 156*a* through 156*l* and ultrasonic sensor 177 are not all simultaneously emitting or receiving sound waves and the wiring 158 for each of the ultrasonic sensors 156a through 156l and ultrasonic sensor 177 is not simultaneously carrying electronic signals.

This method of operating the plurality of ultrasonic sensors 156 and 177 eliminates the need for the wiring 158 for each ultrasonic sensor 156a through 156l and ultrasonic sensor 177 to be individually shielded and the ultrasonic sensors 156a through 156l and ultrasonic sensor 177 can be disposed closer together (i.e., even closer than is shown in FIG. 1B) than in prior art systems, both of which enable a greater number of ultrasonic sensors to be disposed within the barrel 123. In an exemplary configuration, the wiring 158 comprises a multi conductor shielded cable having a plurality of inner conductors that are not individually shielded, where a separate inner conductor is connected to each ultrasonic sensor of the plurality of ultrasonic sensors 156 and ultrasonic sensor 177 to serve as the signal line, and an outer shield of the multi conductor shielded cable serves as a common return line and ground for all of the ultrasonic sensors of the plurality of ultrasonic sensors 156 and ultrasonic sensor 177. For example, a coaxial cable can be used as the multi conductor shielded cable, where the inner conductors are connected to the plurality of ultrasonic sensors 156 and ultrasonic sensor 177 to serve as the signal lines, and the outer shield of the coaxial cable serves as the common return line. In a preferred embodiment, the multi-conductor shielded cable is a commercially available cable such as a model 83562 cable manufactured by Belden, Inc. of St. Louis, Mo., USA.

The neck tube 108 is disposed within the seal fitting members 102a and 102b and the flexible connector 104. The neck tube 108 is secured to the seal fitting member 102a by a fusion weld (i.e., a bead) made within the weld zone 148. Preferably, the weld occupies only a portion of the weld zone 148 and is made where the sidewall 114 of the neck tube 108 abuts the seal fitting member 102a. The seal fitting member 102a includes a protruding sealing surface (i.e., a seal face) 150 that extends around the neck tube 108. The protruding sealing surface 150 has an inner edge 151 that is separated from the sidewall 114 of the neck tube 108 by a distance D1. In order to prevent impairment of the protruding sealing surface 150 by a weld within the weld zone 148 (e.g., welding material can create a raised surface and/or the heat of welding can deform the protruding sealing surface 150), distance D1 is preferably at least 2.0 mm (0.079 inch) and, more preferably, at least 6.0 mm (0.24 inch). The seal fitting member 102b includes a threaded region 152 that engages an opposite threaded region 166 of another seal fitting member 164 of the seal fitting assembly 157. Ultrasonic probe 100 might also include testing ports (not shown) used for leak detection when the ultrasonic probe 100 is secured to the container 159. In an alternate embodiment, the seal fitting member 102a and the neck tube 108 could be manufactured as a single, integral piece, for example from a single round of steel, thereby eliminating the need to manufacture these parts separately and weld them together.

The barrel 123 has an outer diameter D3 (i.e., the outer diameter of the outer tube 122). The neck tube 108 and the inner tube 132 have an outer diameter D2 that is less than the outer diameter D3 of the barrel 123. The larger outer diameter D3 of the barrel 123 relative to the outer diameter D2 of the inner tube 132 provides an increased amount of space within the internal volume 146 that is necessary to house the increased number of ultrasonic sensors 156a through 156l and ultrasonic sensor 177 and their respective wiring 158. Preferably, the ratio of the outer diameter D2 of the inner tube 132 to the outer diameter D3 of the barrel 123 is less than or equal to 0.95. More preferably, the ratio of the outer diameter D2 of the inner tube 132 to the outer diameter D3 of the barrel 123 is less than or equal to 0.95 and greater than or equal to 0.3. More preferably, the ratio of the outer diameter D2 of the inner tube 132 to the outer diameter D3 of the barrel 123 is less than or equal to 0.8, and the outer diameter D3 of the barrel 123 is no greater than 0.827 inches (21.0 mm). More preferably, the ratio of the outer diameter D2 of the inner tube 132 to the outer diameter D3 of the barrel 123 is less than or equal to 0.8 and greater than or equal to 0.4. More preferably, the outer diameter D2 of the inner tube 132 is approximately five-sixteenths of an inch (7.9 mm), and the outer diameter D3 of the barrel 123 is approximately five-eighths of an inch (15.9 mm). Preferably, there exists a minimum distance between the sidewall 128 of the outer tube 122 and the sidewall 138 of the inner tube 132 of at least 0.10 inches (2.5 mm) where the plurality of ultrasonic sensors 156 and ultrasonic sensor 177 includes at least four ultrasonic sensors, and a minimum distance of at least 0.15 inches (3.8 mm) where the plurality of ultrasonic sensors 156 includes the twelve (12) ultrasonic sensors 156a through 156l and ultrasonic sensor 177.

In other embodiments, such as described in related co-pending U.S. patent application Ser. No. 14/163,407, ultrasonic probe 100 might employ different constructions of neck tube 108 and barrel 123. For example, in some embodiments, such as described in related co-pending U.S. patent application Ser. No. 14/163,407, shoulder portion 113 of neck tube 108 is formed by sidewall 114 rather than as a separate piece and is integral with the remainder of the neck tube 108 (i.e., the neck tube 108 and shoulder portion 113 are a single piece of material), for example by shoulder portion 113 having a bell shape that transitions from the outer diameter D2 of neck tube 108 to the outer diameter D3 of neck tube 108, which is also the outer diameter of barrel 123.

Further, other embodiments described in related co-pending U.S. patent application Ser. No. 14/163,407 might employ an outer tube 122 of ultrasonic probe 100 that does not include a through hole disposed in the sidewall 128, and where upper end 124 of outer tube 122 is not coupled to a shoulder tube or to the lower end 112 of the neck tube 108. Instead, the upper end 134 of the inner tube 132 might be aligned with a through hole disposed in the sidewall of a collar that is coupled to the lower end 112 of neck tube 108 and the upper end 124 of outer tube 122. The collar might enable barrel 123 to be constructed as one or more assemblies, which might advantageously allow the plurality of ultrasonic sensors 156 to be tested prior to completing assembly of barrel 123. In addition, this feature is advantageous because most of the components of the barrel 123 can be welded together prior to installing the plurality of ultrasonic sensors 156, where the heat from welding might otherwise damage the plurality of ultrasonic sensors 156 and/or the bonds which hold the plurality of ultrasonic sensors 156 in place within the internal volume 146.

Figure 2:
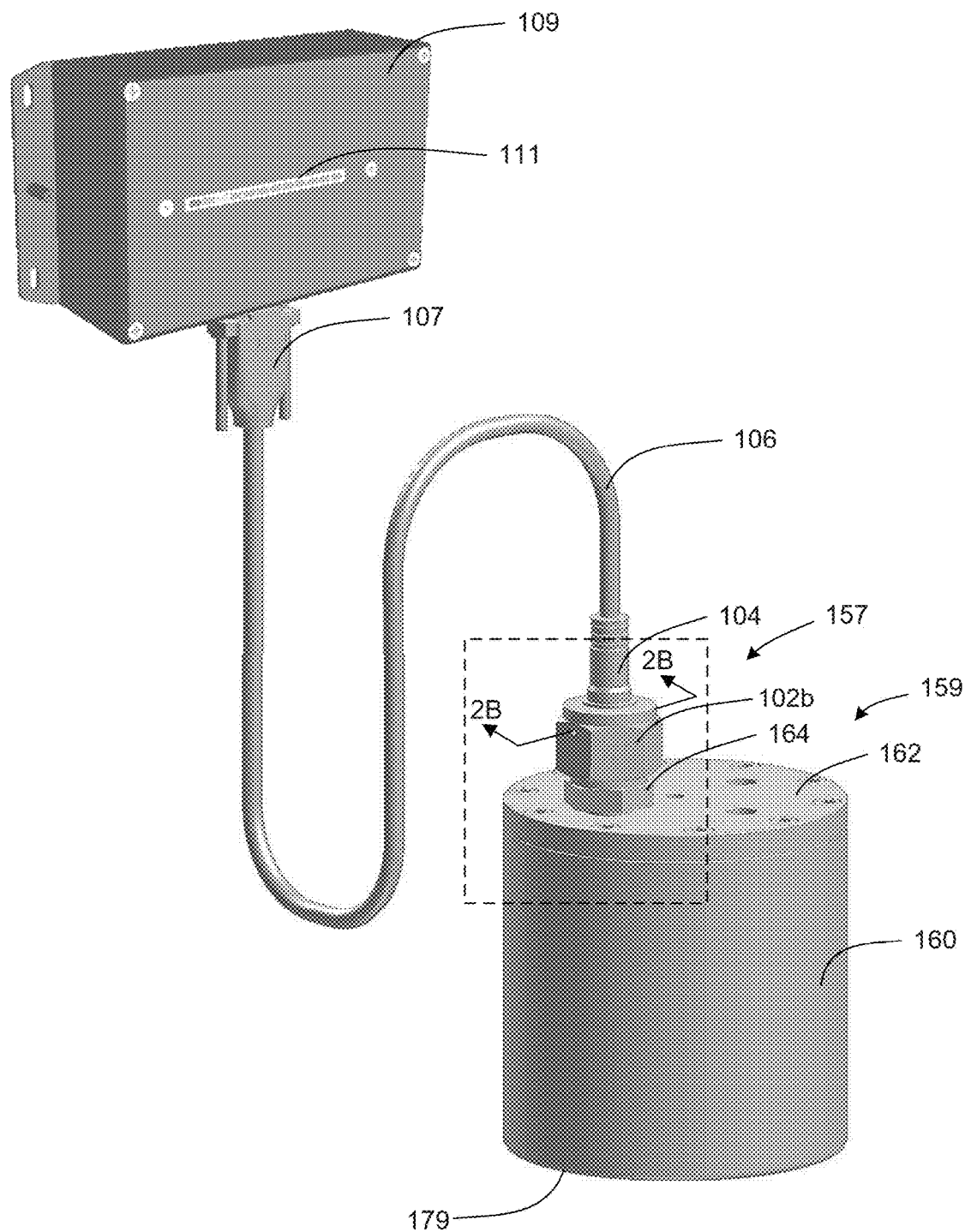
FIG. 2 is a perspective view of the ultrasonic probe of FIGS. 1A and 1B installed on a container in accordance with an exemplary embodiment of the present invention.

FIG. 2 shows a perspective view of the ultrasonic probe 100 installed on a container 159 in accordance with an exemplary embodiment of the present invention. The ultrasonic probe 100 includes the controller 109 and the LED meter 111, as previously discussed. The container 159 comprises a body 160, an upper portion 162, and a seal fitting member 164 coupled to the upper portion 162. As will be apparent to those of ordinary skill in the art, the container 159 may include other components that are not shown in FIG. 2 for clarity and illustrative purposes (e.g., additional valves and hardware for refilling the container 159). The body 160 and upper portion 162 define an internal volume that can contain fluid. In this embodiment, the upper portion 162 is a lid coupled to the body 160. In other embodiments, the upper portion 162 can be an integral part of the body 160. The seal fitting member 164, like the seal fitting members 102a and 102b, is a portion of the seal fitting assembly 157 that secures the ultrasonic probe 100 to the container 159. In this exemplary embodiment, the components of the container 159 are composed of one or more metals.

Figure 3:
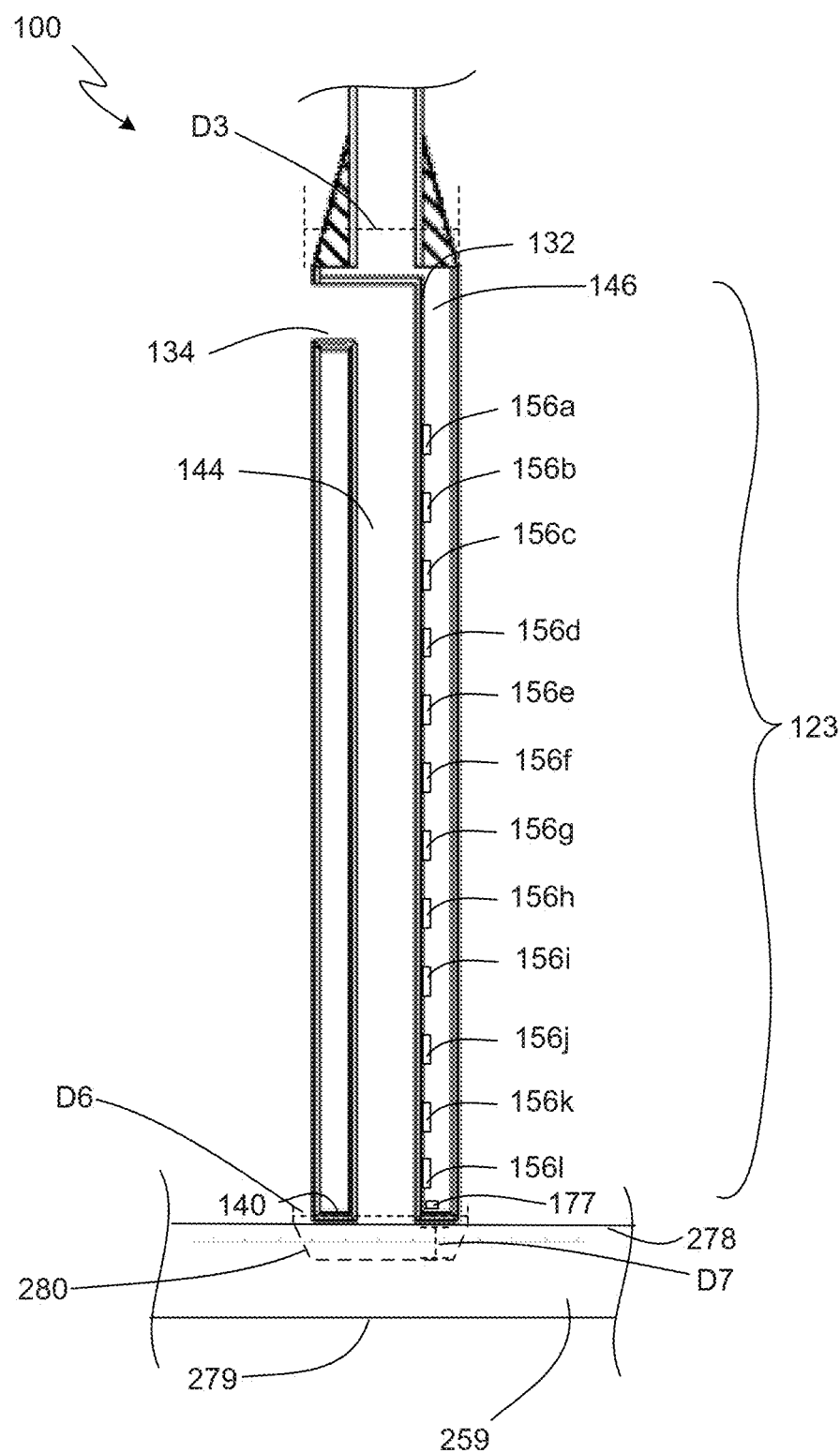
FIG. 3 is a non-exploded sectional view, taken along line 1B-1B, of the ultrasonic probe of FIG. 1A in accordance with another exemplary embodiment of the present invention.

To further increase the accuracy of ultrasonic probe 100, in some embodiments, base 179 of container 159 might incorporate a feature allowing disc cap 140 (e.g., the bottom end of ultrasonic probe 100) to be disposed closer to base 179 of container 159, while still allowing liquid to flow into conduit 144. For example, as shown in FIG. 3, a sump 280 might be added into base 279 of container 259. As shown in FIG. 3, in exemplary embodiments, sump 280 is slightly wider (e.g., by a distance D6) than the outer diameter, D3, of barrel 123. In a preferred embodiment, sump 280 might be a round hole machined into base 279 of container 259, the center of sump 280 coaxially aligned with the center of conduit 144 and having a depth, D7, of 0.15 inches (0.38 cm) and a diameter, D6, of 0.80 inches (2.03 cm).

Other embodiments of sump 280 are possible, for example, such as a machined or formed channel in base 279 of container 259, having base 279 of container 259 angled to form a depressed area near the bottom of ultrasonic probe 100, and other similar implementations. Regardless of the shape of the sump 280 in other embodiments, it is preferable that the upper opening of the sump 280 be shaped and located in the base 279 of the container 259 to overlap vertically with the entire disc cap 140. In other words, the cross-sectional shape of the upper opening of the sump 280 if the probe 100 were lowered vertically from its normal installed position, the bottom end of the probe 100 would fit into the sump 280. In embodiments in which the sump 280 has a circular upper opening and the barrel 223 is cylindrical the diameter of the sump is preferably between 100.1% and 110% of the diameter of the barrel 223. It is also preferable that the sump have a relatively small volume, accordingly, the volume of the sump 280 is preferably less than 1% of the overall usable liquid capacity of the container 259. More preferably, the volume of the sump 280 is preferably less than 0.2% of the overall usable liquid capacity of the container 259.

In embodiments employing a sump, although suppliers would need to produce containers with a sump, machining sump 280 into base 279 of container 259 detects a lowest residual liquid level without the container completely running out. For example, in a standard 1.2 L ampoule, described embodiments of ultrasonic probe 100 in containers that also employ sump 280 can measure a lowest liquid level of 10-20 cc, less than typical prior art that might only be able to detect a lowest liquid level of 65-75 cc.

Figure 4:
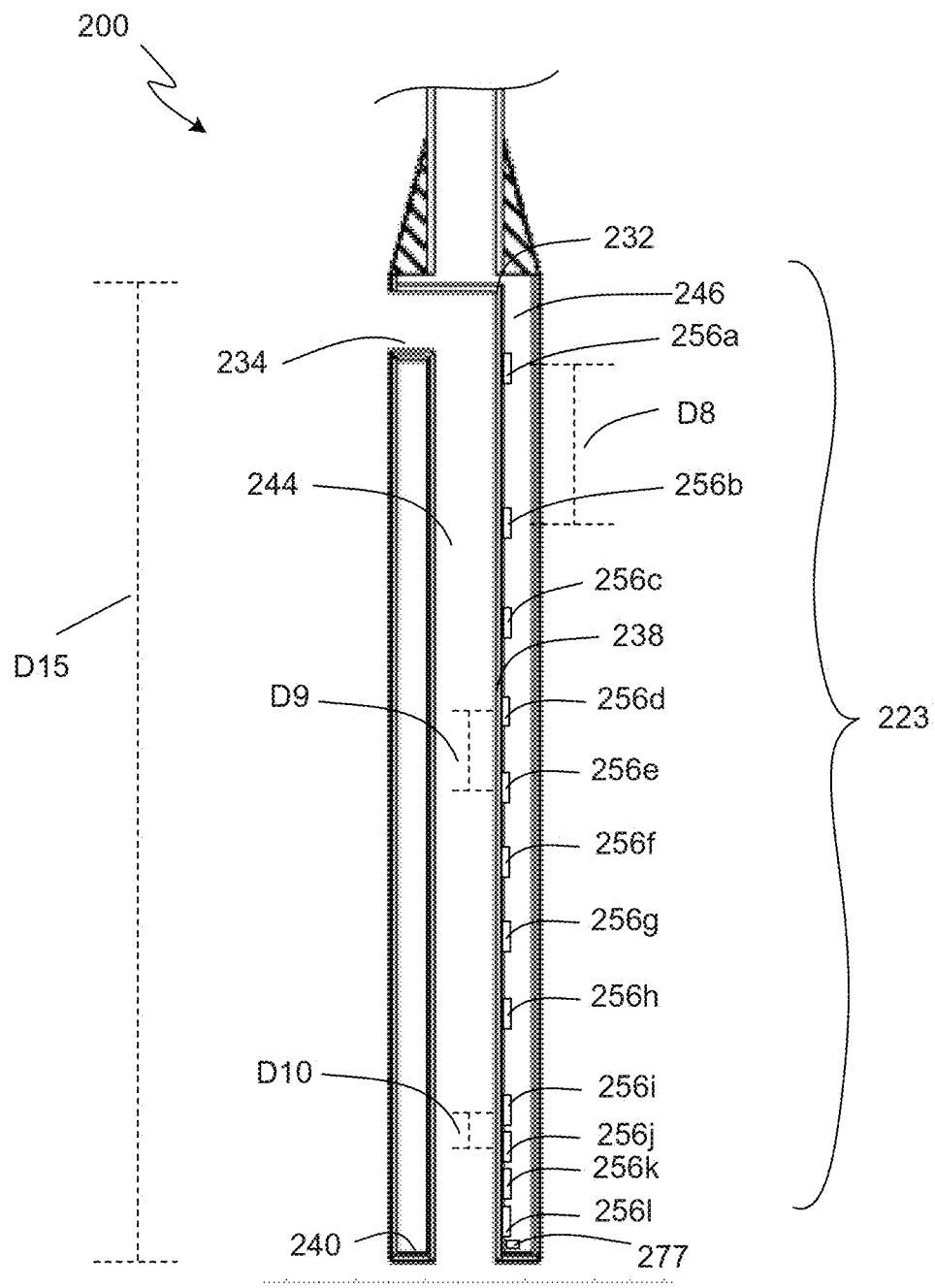
FIG. 4 is a non-exploded sectional view, taken along line 1B-1B, of the ultrasonic probe of FIG. 1A in accordance with another exemplary embodiment of the present invention.

As shown in FIG. 4, some embodiments of ultrasonic probe 200 might employ different vertical spacing (variable spacing) between ultrasonic sensors 256 along the length D15 of the barrel 223. For example, ultrasonic sensors 256 that are disposed closer to the top of ultrasonic probe 200 correspond to measuring levels of liquid within container 159 where container 159 is relatively full (e.g., conduit 244 contains a high level of liquid). When container 159 is relatively full, the need for high accuracy of liquid level measurement might be relatively less than when container 159 is relatively empty (e.g., conduit 244 contains a low level of liquid). Therefore, as shown in FIG. 4, some embodiments of ultrasonic probe 200 might cluster two or more of the plurality of ultrasonic sensors 256 closer together near the bottom of ultrasonic probe 200 (e.g., corresponding to container 159 being more empty) to more accurately measure the liquid level within container 159 as container 159 contains less liquid and, therefore, is closer to becoming completely empty.

For example, as shown in FIG. 4, ultrasonic sensors 256i, 256j, 256k, and 256l are grouped more closely together than ones of the plurality of ultrasonic sensors 256a through 256h that are disposed higher within ultrasonic probe 200 (e.g., the ones of the plurality of ultrasonic sensors 256 that correspond to higher levels of liquid within conduit 244 and, therefore, container 159). Although shown in FIG. 4 as employing a grouping of 4 of the plurality of ultrasonic sensors 256 near the bottom of ultrasonic probe 200, FIG. 4 is meant to be exemplary, and other groupings, spacings, and numbers of variable spacings between the various ultrasonic sensors 256 might be employed in alternative embodiments. Further, FIG. 4 is not drawn to scale.

It may also be possible to include more than two groups of ultrasonic sensors with different vertical spacing. In the embodiment shown in FIG. 4, three groups of sensors are provided, an upper group (sensors 256a, 256b, 256c), a middle group (sensors 256d through 256h), and a lower group (sensors 256i through 256l). The sensors in the upper group have the largest vertical spacing D8, the sensors in the middle group have vertical spacing D9 that is smaller than vertical spacing D8 but larger than the vertical spacing D10 of the sensors of the lower group. In alternate embodiments, the vertical spacing between each of the ultrasonic sensors in either the upper group or the lower group is identical. In further alternate embodiments, the vertical spacing between each of the ultrasonic sensors in the upper group is identical and the vertical spacing between each of the ultrasonic sensors in the lower group is identical. As used herein, the term "vertical spacing" is intended to refer to the distance between the centers of two adjacent sensors along a longitudinal axis (see axis 1D of FIG. 1B) of the barrel 232 (which is parallel to the length D15).

By employing variable vertical spacing between the various ultrasonic sensors 256, embodiments of ultrasonic probe 200 can achieve greater precision in measuring the liquid level within container 159, especially when the liquid level is lower and container 159 is closer to being empty, without increasing the number of ultrasonic sensors 256. In exemplary embodiments, six points can be measured in as little as 0.375 inches (0.95 centimeter) of liquid in container 159, versus prior systems where six points are measured in approximately 1.8 inches of liquid in container 159.

In many applications, it will be desirable to have a wider vertical spacing of sensors on a larger portion of the barrel 223 than the portion of the barrel 223 in which closer/tighter spacing of sensors is employed. In most applications, wider spacing of sensors is desirable on more than half of the barrel 223 and in many applications, wider spacing of sensors is desirable on more than three-quarters of the length of the barrel 223, leaving the closer/tighter sensor spacing on less than one-quarter of the length of the barrel 223.

Figure 5:
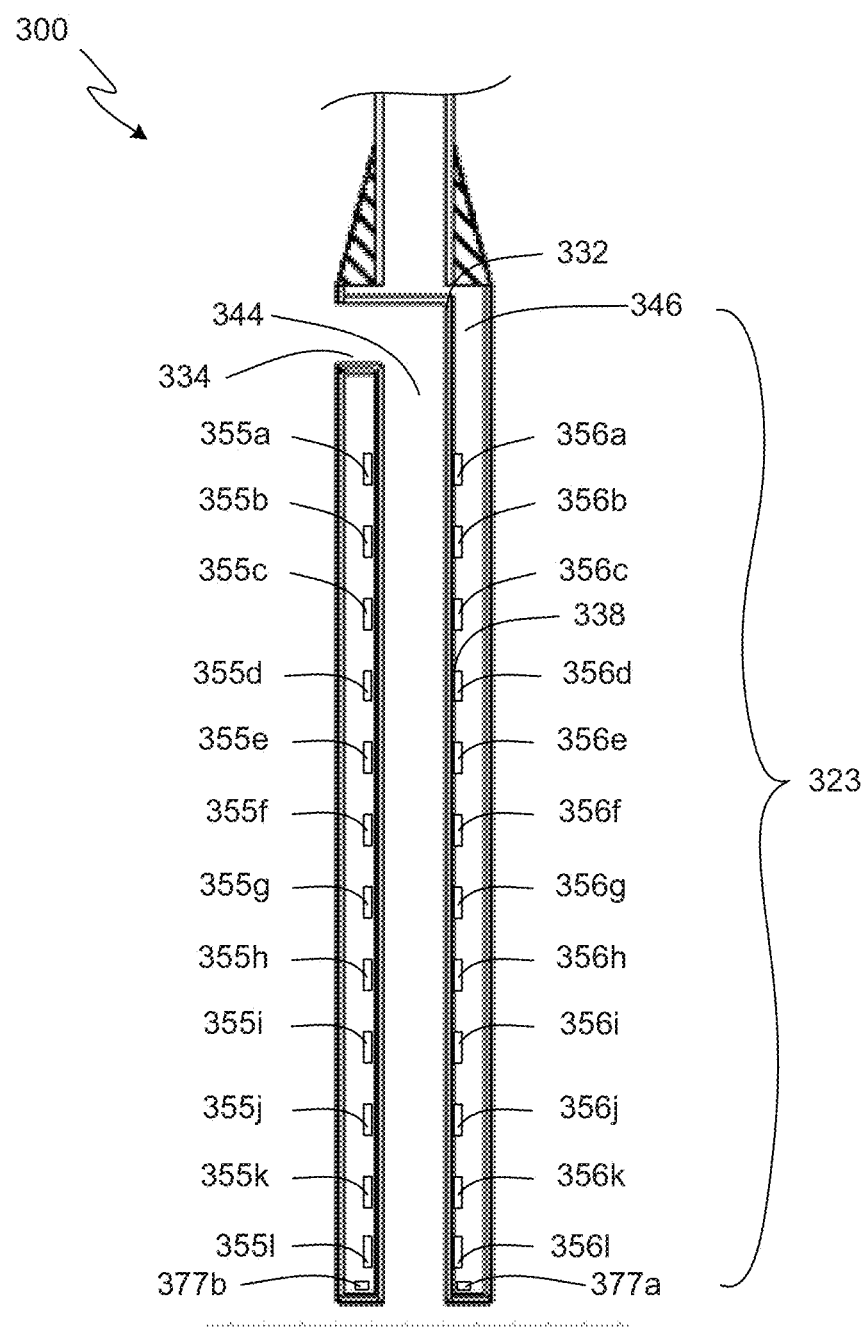
FIG. 5 is a non-exploded sectional view, taken along line 1B-1B, of the ultrasonic probe of FIG. 1A in accordance with another exemplary embodiment of the present invention.

FIG. 5 shows another exemplary embodiment of ultrasonic probe 300. As shown in FIG. 5, some embodiments of ultrasonic probe 300 might employ pairs of ultrasonic sensors at matched height levels vertically within ultrasonic probe 300 and along the barrel 323. For example, ultrasonic sensor 356a is paired with ultrasonic sensor 355a, ultrasonic sensor 356b is paired with ultrasonic sensor 355b, and so on, up to ultrasonic sensor 356l that is paired with ultrasonic sensor 355l. Similarly, downward-facing ultrasonic sensor 377a might be paired with downward-facing ultrasonic sensor 377b. Some embodiments such as shown in FIG. 5 might further employ duplicate electronics (e.g., controller 109) to control ultrasonic sensors 355, 356 and 377, offering additional redundancy. Even in embodiments employing duplicate electronics, both sets of electronics might be installed in a single enclosure to reduce cost and space requirements. In embodiments employing duplicate electronics, both controllers might be in electrical communication with one another, with one controller configured as a master and the other controller configured as a slave, where a first subset of ultrasonic sensors 355, 356 and 377 are in electrical communication with one controller and a second subset of ultrasonic sensors 355, 356 and 377 are in electrical communication with the other controller.

Although described here as involving two controllers, other embodiments might employ other numbers of redundant controllers. The master and slave configurations might be automatically updated by either controller if one of the controllers becomes unresponsive. Other embodiments might employ only one set of electronics to control all ultrasonic sensors 355, 356 and 377 to reduce cost and complexity.

Thus, embodiments such as shown in FIG. 5 provide redundant liquid level sensing, thus offering greater durability and accuracy of ultrasonic probe 300. Further, by providing redundant sensing capability in a single ultrasonic probe, described embodiments eliminate the need for two separate probes and penetrations in the lid of container 159, which can be both costly and space consuming. Although shown in FIG. 5 as a 12 level ultrasonic probe (e.g., ultrasonic sensors 355 and 356) having a downward-facing sensor (e.g., ultrasonic sensors 377a and 377b), embodiments of ultrasonic probe 300 might employ other numbers of ultrasonic sensors disposed at matched height levels vertically within ultrasonic probe 300.

Figure 6:
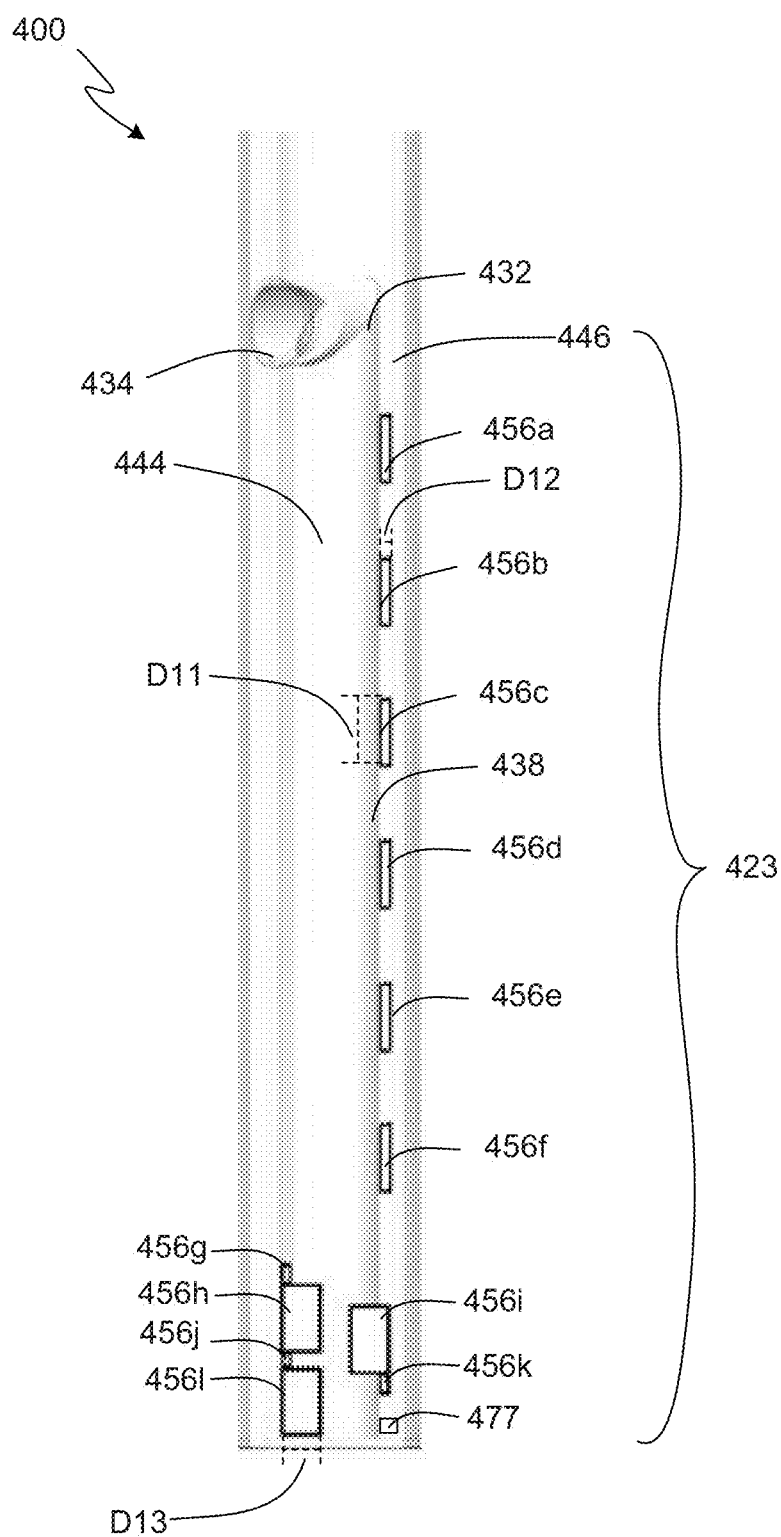
FIG. 6 is a perspective view of the ultrasonic probe shown in FIG. 1A in accordance with another exemplary embodiment of the present invention.

In order to enable the ultrasonic sensors to be more closely vertically spaced, each of the ultrasonic sensors could be offset from the sensor immediately above and below it—meaning that each of the ultrasonic sensors does not overlap vertically with the sensor immediately above it or immediately below it. One way of accomplishing this is shown in FIG. 6, which shows that ultrasonic probe 400 has a plurality of ultrasonic sensors 456 are disposed in a spiral arrangement around inner tube 432 (e.g., on sidewall 438) within internal volume 446 of the barrel 423. By locating the plurality of ultrasonic sensors 456 in a spiral arrangement around inner tube 432, the vertical distance between adjacent ones of the plurality of ultrasonic sensors can be reduced, allowing a smaller incremental vertical spacing between each one of ultrasonic sensors 456 and, thereby, achieve more precise measurement of the liquid level within container 159 (e.g., within conduit 444). In a preferred embodiment, the spiral arrangement of ones of the plurality of ultrasonic sensors 456 might be employed near the bottom end of ultrasonic probe 400, for example to implement variable spacing of the various ultrasonic sensors as described in regard to FIG. 3. In exemplary embodiments, ultrasonic sensors 456 are generally rectangular in shape, having a height, D11, of 0.25 inches (0.64 centimeter), a depth, D12, of 0.050 inches (0.13 centimeter) and a width, D13, of 0.18 inches (0.46 centimeter). In exemplary embodiments employing a spiral arrangement of the plurality of ultrasonic sensors 456, the vertical spacing between each ultrasonic sensor 456 could be reduced to approximately 0.075 inches (approximately 0.19 centimeter) vertical spacing between the center of a lower one of the ultrasonic sensors 456 and the center of an upper one of the ultrasonic sensors 456 (for example, 0.075 inches (0.19 centimeter) vertically center-to-center of ultrasonic sensor 456l and ultrasonic sensor 456k). Prior art ultrasonic sensors achieved a closest spacing of adjacent ultrasonic sensors of approximately 0.3 inches (approximately 0.76 centimeter) vertically center-to-center. It is preferable the vertical spacing of the vertically offset sensors be less than 0.3 inches (0.76 cm).

In another alternate embodiment (not shown), a least some of the ultrasonic sensors are arranged in a spiral arrangement (i.e., with all of the vertical offsets being equal and in the same direction) in which each adjacent sensor is positioned at a 90-degree vertical offset from the sensors immediately above and below it. Under this arrangement every fifth sensor would be vertically aligned. In this arrangement, the minimum vertical spacing of each sensor in the spiral arrangement would need to be sufficient to provide a gap between each of the vertically-aligned sensors. It is preferable that each sensor be vertically offset from vertically adjacent sensors (e.g., sensors 456h and 456j being vertically adjacent to sensor 456i) at least 30 degrees, more preferably, at least 60 degrees and, most preferably 90 degrees. A 90-degree vertical offset has the advantage of making placement of the sensors more uniform.

For example, in a standard 1.2 L ampoule, employing a vertical ultrasonic sensor spacing of 0.075 inches (0.19 centimeter) center-to-center allows tracking increments of 24 cc of liquid within container 159. In a preferred embodiment, a spiral arrangement is employed for a portion of the plurality of ultrasonic sensors 456 disposed lower on ultrasonic probe 400 (e.g., container 159 contains less liquid), while a standard vertical arrangement is employed for a portion of the plurality of ultrasonic sensors 456 disposed higher on ultrasonic probe 400 (e.g., container 159 contains more liquid). In a particular example, the lower six ultrasonic sensors (e.g., sensors 456g through 456l) are disposed on sidewall 438 of inner tube 432 in a spiral arrangement having a vertical spacing of 0.075 inches (0.19 centimeter) center-to-center between each, and the upper six ultrasonic sensors (e.g., sensors 456a through 456f) are disposed on sidewall 438 of inner tube 432 in a standard vertical arrangement having a spacing of approximately 0.5 inches (approximately 1.3 centimeters) center-to-center between each. Thus, the lower six ultrasonic sensors (e.g., sensors 456g through 456l) measured the liquid contained in container 159 in increments of 24 cc between each sensor (where more precision is desirable since container 159 is closer to being empty), and the upper six ultrasonic sensors (e.g., sensors 456a through 456f) measured the liquid contained in container 159 in increments of 160 cc between sensors (where precision is not as important because container 159 is closer to being full). Although shown in FIG. 6 as being disposed in a spiral arrangement around inner tube 432, other arrangements where adjacent ones of ultrasonic sensors 456 are not vertically aligned are also possible.

Thus, the described embodiments of an ultrasonic probe satisfy a need in the art for an ultrasonic probe having increased quantities of ultrasonic sensors that can be used with existing container fittings having standardized dimensions. The barrel 123 has an outer diameter D3 that provides an increased amount of space within the internal volume 146 that is necessary to house the increased number of ultrasonic sensors 156a through 156l and ultrasonic sensor 177 and their respective wiring 158. In prior art ultrasonic probe designs, the barrel typically extends into the seal fitting assembly. An increased outer diameter of the barrel would therefore require a larger and/or non-standard seal fitting assembly, or modifying a standard seal fitting assembly such as by boring out a through hole (e.g., through hole 103 of the seal fitting member 102a) so it can receive the larger barrel diameter. However, non-standard fitting assemblies are typically much more expensive than their standardized counterparts and may also require the use of other non-standardized components. Non-standard fitting assemblies also do not benefit from the extensive testing and proven history of standardized fitting assemblies for use in semiconductor manufacturing processes. Larger seal fittings also require more space on the lid of the container (e.g., upper portion 162) and can make obtaining a tight seal more difficult. Finally, the inventors have found that attempts to modify standard seal fitting assemblies to receive a larger barrel diameter can negatively affect the structural integrity of the ultrasonic probe and/or the seal fitting assembly. For example, referring to FIG. 1B, if the through hole 103 in the seal fitting member 102a was bored out to receive the larger outer diameter D2 instead of the outer diameter D2 of the neck tube 108, the distance D1 would be decreased. As a result, the size of the weld zone 148 would also be decreased, and the heat of welding could damage (i.e., warp) the protruding sealing surface 150 and negatively affect the integrity of the seal made between the protruding sealing surface 150.

Unlike prior art probe designs, the barrel 123 of the ultrasonic probe 100 does not extend into the seal fitting member 102a. Instead, the barrel 123 is coupled to the neck tube 108, which is in turn coupled to the seal fitting member 102a. The neck tube 108 has an outer diameter D2 that is less than the outer diameter D3 of the barrel 123 (i.e., the ratio of D2 to D3 is less than one), which enables the through hole 103 of the seal fitting members 102a to have a smaller bore size, as opposed to requiring a larger seal fitting (e.g., a 1 inch seal fitting) or boring out the through hole 103 in the seal fitting member 102a to accommodate the increased outer diameter D3 of the barrel 123. The smaller outer diameter D2 of the neck tube 108 also provides the necessary distance D1 to have a sufficiently large weld zone 148 such that the neck tube 108 and the seal fitting member 102a can be welded together without welding material and/or welding heat impairing the protruding sealing surface 150. Preventing such damage to the protruding sealing surface 150 is critical to maintaining the integrity of the seal between the protruding sealing surface 150, and therefore maintaining the assay (purity) of the chemical reagent for use in semiconductor manufacturing.

Further, described embodiments of the present invention provide more accurate sensing of liquid levels within container 159 by including at least one downward-facing ultrasonic sensor (e.g., ultrasonic sensor 177) to measure liquid levels between disc cap 140 and inner surface 178 of the base of container 159. Some embodiments might also include forming a sump in the base of container 259 to allow disc cap 140 (e.g., the bottom end of ultrasonic probe 100) to be disposed closer to, or below, base 279 of container 259, while still allowing liquid to flow into conduit 144, thereby allowing ultrasonic probe 100 to detect a lower residual liquid level within container 259 than prior art ultrasonic probes. For example, described embodiments of ultrasonic probe 100 in containers employing sump 280 can measure a lowest liquid level of 10-20 cc, versus typical prior art probes that detect a lowest liquid level of 65-75 cc.

Other embodiments of the present invention might employ variable spacing between ultrasonic sensors 256 to allow ones of the plurality of ultrasonic sensors 256 that are disposed closer to the bottom of ultrasonic probe 200 (e.g., corresponding to container 159 being more empty) to more accurately measure the liquid level within container 159 as container 159 contains less liquid and, therefore, is closer to becoming completely empty. By employing variable spacing between the various ultrasonic sensors 156, embodiments of ultrasonic probe 200 can achieve greater precision in measuring the liquid level within container 159, especially when the liquid level is lower and container 159 is closer to being empty, without increasing the number of ultrasonic sensors 256. In exemplary embodiments, six points can be measured in as little as 0.375 inches (0.95 centimeter) of liquid in container 159, versus prior systems where six points are measured in approximately 1.8 inches (approximately 4.6 centimeters) of liquid in container 159.

Yet other embodiments of the present invention might employ pairs of ultrasonic sensors at matched height levels vertically within ultrasonic probe 300 to provide redundant liquid level sensing, thus offering greater durability and accuracy of ultrasonic probe 300 and eliminating the need for two separate probes and two penetrations in the lid of container 159. Some embodiments employing duplicate ultrasonic sensors might further employ duplicate electronics to control a corresponding one of the sets of ultrasonic sensors, although both sets of electronics might be installed in a single housing to reduce cost and space requirements.

In yet another embodiment of the present invention, ones of the plurality of ultrasonic sensors 456 of ultrasonic probe 400 are disposed in a spiral arrangement around inner tube 432 (e.g., on sidewall 438) within internal volume 446. By locating ones of the plurality of ultrasonic sensors 456 in a spiral arrangement around inner tube 432, the vertical distance between adjacent ones of the plurality of ultrasonic sensors is reduced, allowing a smaller incremental vertical spacing between each one of ultrasonic sensors 456 and, thereby, achieving more precise measurement of the liquid level within container 159. Further embodiments of the present invention might use a combination of variable spacing of the plurality of ultrasonic sensors 456 and the spiral arrangement of ones of the plurality of ultrasonic sensors 456 to achieve closer spacing between adjacent ultrasonic sensors closer to the bottom of ultrasonic probe 400. Additional embodiments might also employ any combination of a downward-facing ultrasonic sensor (e.g., ultrasonic sensor 177), the variable spacing of the plurality of ultrasonic sensors 256, the spiral arrangement of ones of the plurality of ultrasonic sensors 456, and the inclusion of matched pairs of ultrasonic sensors (e.g., ultrasonic sensors 355, 356 and 377) for redundancy.

While the principles of the invention have been described above in connection with preferred embodiments, it is to be clearly understood that this description is made only by way of example and not as a limitation of the scope of the invention.

The invention claimed is:
1. An ultrasonic probe for sensing a liquid level within a container, the ultrasonic probe comprising:
 a barrel extending downwardly from a fitting assembly to have a length and comprising:
 an outer tube and an inner tube having a longitudinal axis and a lower end that is distal to the fitting assembly;
 an internal volume formed between the outer tube and the inner tube;
 a conduit formed longitudinally within the inner tube; and
 a plurality of ultrasonic sensors located within the internal volume of the barrel, each of the plurality of ultrasonic sensors configured to emit sound waves in response to received electronic signals, each of the plurality of ultrasonic sensors having a vertical spacing;

wherein at least one of the plurality of ultrasonic sensors is affixed to the inner tube at a location and in an orientation adapted to emit sound waves across the conduit of the barrel in response to a received electronic signal;

wherein the plurality of ultrasonic sensors includes an upper group comprising at least three ultrasonic sensors and a lower group comprising at least three ultrasonic sensors, the ultrasonic sensors of the upper group being located further from the lower end of the inner tube than any of the ultrasonic sensors of the lower group, the vertical spacing of each of the ultrasonic sensors in the lower group being less than the vertical spacing of any of the ultrasonic sensors in the upper group.

2. The ultrasonic probe of claim 1, wherein each of the ultrasonic sensors of the lower group is vertically offset from each vertically adjacent ultrasonic sensor of the lower group.

3. An ultrasonic probe for sensing a liquid level within a container, the ultrasonic probe comprising:

a barrel extending downwardly from a fitting assembly to have a length and comprising:

an outer tube and an inner tube having a longitudinal axis and a lower end that is distal to the fitting assembly;

an internal volume formed between the outer tube and the inner tube;

a conduit formed longitudinally within the inner tube; and a plurality of ultrasonic sensors located within the internal volume of the barrel, each of the plurality of ultrasonic sensors configured to emit sound waves in response to received electronic signals;

wherein at least one of the plurality of ultrasonic sensors is affixed to the inner tube at a location and in an orientation adapted to emit sound waves across the conduit of the barrel in response to a received electronic signal;

wherein the plurality of ultrasonic sensors comprises at least one sensor that is offset from each vertically adjacent ultrasonic sensor.

4. The ultrasonic probe of claim 3, wherein the each of the plurality of ultrasonic sensors has a vertical spacing, the plurality of ultrasonic sensors includes an upper group comprising at least three ultrasonic sensors and a lower group comprising at least three ultrasonic sensors, the ultrasonic sensors of the upper group being located further from the lower end of the inner tube than any of the ultrasonic sensors of the lower group, each of the ultrasonic sensors of the lower group is vertically offset from each vertically adjacent ultrasonic sensor of the lower group.

5. The ultrasonic probe of claim 4, wherein the vertical offset of each of the ultrasonic sensors of the lower group is in a same circumferential direction as the vertical offset of all of the other ultrasonic sensors of the lower group.

6. The ultrasonic probe of claim 4, wherein the vertical spacing between each of the ultrasonic sensors in either the upper group or the lower group is identical.

7. The ultrasonic probe of claim 6, wherein the vertical spacing between each of the ultrasonic sensors in the upper group is identical and the vertical spacing between each of the ultrasonic sensors in the lower group is identical.

8. The ultrasonic probe of claim 4, wherein the plurality of ultrasonic sensors includes a middle group comprising at least three ultrasonic sensors, the ultrasonic sensors of the middle group being located further from the lower end of the inner tube than any of the ultrasonic sensors of the lower group and closer to the lower end of the inner tube than any of the ultrasonic sensors of the upper group, the vertical spacing of each of the ultrasonic sensors in the middle group being less than the vertical spacing of any of the ultrasonic sensors in the upper group and greater than the vertical spacing of any of the ultrasonic sensors of the lower group.

9. The ultrasonic probe of claim 4, wherein the vertical spacing of the ultrasonic sensors in the lower group is less than 0.3 inches (0.76 cm).

10. The ultrasonic probe of claim 4, wherein the lower group comprises at least four ultrasonic sensors.

11. The ultrasonic probe of claim 4, wherein the lower group is located with a lower quarter of the length of the barrel, the lower quarter being distal to the fitting assembly.

12. The ultrasonic probe of claim 4, wherein the plurality of ultrasonic sensors comprises a downward-facing sensor oriented to emit sound waves toward a base of the container.

13. The ultrasonic probe of claim 12, wherein the downward-facing sensor is affixed to an end disc cap of the barrel, the end disc cap of the barrel substantially perpendicular to the inner tube, such that the downward-facing sensor is oriented to emit sound waves in a direction substantially parallel to a longitudinal axis of the barrel.

14. The ultrasonic probe of claim 12, wherein the base of the container comprises a sump positioned such that at least a portion of the sump is vertically aligned with the barrel when the ultrasonic probe is installed in the container.

15. The ultrasonic probe of claim 14, wherein the sump is aligned coaxially with the longitudinal axis of the barrel of the ultrasonic probe when the ultrasonic probe is installed in the container.

16. The ultrasonic probe of claim 14, wherein the sump has a diameter larger than the diameter of the barrel.

17. The ultrasonic probe of claim 4, wherein the plurality of ultrasonic sensors comprises matched pairs of ultrasonic sensors, each of the matched pairs of ultrasonic sensors comprising a first and second ultrasonic sensors disposed horizontally across the conduit from one another at a matched height of the barrel.

18. The ultrasonic probe of claim 17, wherein the ultrasonic probe is electrically coupled to at least one controller that is configured to send electronic signals to and receive electronic signals from the plurality of ultrasonic sensors, wherein the at least one controller is programmed to send electronic signals to only one of the first and second ultrasonic sensors of a matched pair at a time.

19. The ultrasonic probe of claim 18, wherein the at least one controller comprises a first controller electrically coupled to a first ultrasonic sensor of each matched pair of ultrasonic sensors, and a second controller electrically coupled to a second ultrasonic sensor of each matched pair of ultrasonic sensors.

20. The ultrasonic probe of claim 18, wherein each ultrasonic sensor of the plurality of ultrasonic sensors is electrically coupled to the at least one controller by at least one unshielded wire of a multi-conductor shielded cable.

21. The ultrasonic probe of claim 3, wherein each of the plurality of ultrasonic sensors that is offset from each vertically adjacent ultrasonic sensor is vertically offset 90 degrees from each vertically adjacent ultrasonic sensor.

22. An ultrasonic probe for sensing a liquid level within a container, the ultrasonic probe comprising:

a barrel extending downwardly from a fitting assembly to have a length and comprising:

an outer tube and an inner tube having a longitudinal axis and a lower end that is distal to the fitting assembly;

an internal volume formed between the outer tube and the inner tube;

a conduit formed longitudinally within the inner tube; and a plurality of ultrasonic sensors located within the internal volume of the barrel, each of the plurality of ultrasonic sensors configured to emit sound waves in response to received electronic signals, each of the plurality of ultrasonic sensors having a vertical spacing;

wherein at least one of the plurality of ultrasonic sensors is affixed to the inner tube at a location and in an orientation adapted to emit sound waves across the conduit of the barrel in response to a received electronic signal;

wherein the plurality of ultrasonic sensors comprises a downward-facing sensor oriented to emit sound waves toward a base of the container.

23. The ultrasonic probe of claim 22, wherein the downward-facing sensor is affixed to an end disc cap of the barrel, the end disc cap of the barrel substantially perpendicular to the inner tube, such that the downward-facing sensor is oriented to emit sound waves in a direction substantially parallel to a longitudinal axis of the barrel.

24. The ultrasonic probe of claim 22, wherein the base of the container comprises a sump positioned such that at least a portion of the sump is vertically aligned with the barrel when the ultrasonic probe is installed in the container.

25. The ultrasonic probe of claim 24, wherein the sump is aligned coaxially with the longitudinal axis of the barrel of the ultrasonic probe when the ultrasonic probe is installed in the container.

26. An ultrasonic probe for sensing a liquid level within a container, the ultrasonic probe comprising:

a barrel extending downwardly from a fitting assembly to have a length and comprising:

an outer tube and an inner tube having a longitudinal axis and a lower end that is distal to the fitting assembly;

an internal volume formed between the outer tube and the inner tube;

a conduit formed longitudinally within the inner tube; and a plurality of ultrasonic sensors located within the internal volume of the barrel, each of the plurality of ultrasonic sensors configured to emit sound waves in response to received electronic signals;

wherein at least one of the plurality of ultrasonic sensors is affixed to the inner tube at a location and in an orientation adapted to emit sound waves across the conduit of the barrel in response to a received electronic signal;

wherein the plurality of ultrasonic sensors comprises matched pairs of ultrasonic sensors, each of the matched pairs of ultrasonic sensors comprising a first and second ultrasonic sensors disposed horizontally across the conduit from one another at a matched height of the barrel;

wherein the ultrasonic probe is electrically coupled to at least one controller that is configured to send electronic signals to and receive electronic signals from the plurality of ultrasonic sensors, wherein the at least one controller is programmed to send electronic signals to only one of the first and second ultrasonic sensors of a matched pair at a time.

* * * * *